United States Patent
Harada

(10) Patent No.: US 7,154,672 B2
(45) Date of Patent: Dec. 26, 2006

(54) OPTICAL FILM HAVING CONTROLLED SCATTERING/TRANSMITTING CHARACTERISTICS

(75) Inventor: Takamasa Harada, Tokyo (JP)

(73) Assignee: Tomoegawa Co., Ltd., Tokyo (JP)

( * ) Notice: Subject to any disclaimer, the term of this patent is extended or adjusted under 35 U.S.C. 154(b) by 130 days.

(21) Appl. No.: 10/688,541

(22) Filed: Oct. 17, 2003

(65) Prior Publication Data

US 2004/0085640 A1 May 6, 2004

Related U.S. Application Data

(63) Continuation of application No. PCT/JP02/03760, filed on Apr. 16, 2002.

(30) Foreign Application Priority Data

Apr. 20, 2001 (JP) .............................. 2001-123389

(51) Int. Cl.
  *G02B 5/18* (2006.01)
  *G02B 27/42* (2006.01)
(52) U.S. Cl. ...................... 359/558; 359/599; 359/565; 359/487
(58) Field of Classification Search ................. 430/321
  See application file for complete search history.

(56) References Cited

U.S. PATENT DOCUMENTS 5,365,354 A * 11/1994 Jannson et al. ................ 359/15
6,621,635 B1 * 9/2003 Yano ........................... 359/599
2004/0105159 A1 * 6/2004 Saccomanno et al. ....... 359/599

FOREIGN PATENT DOCUMENTS

| EP | 0294122 A1 * | 12/1988 |
| JP | 2-280102 | 11/1990 |
| JP | 6-11606 | 1/1994 |
| JP | 8-297210 | 11/1996 |
| JP | 11-84115 | 3/1999 |
| JP | 2001-31774 | 2/2001 |
| WO | WO 94/29768 A1 * | 12/1994 |
| WO | WO 96/20419 A1 * | 7/1996 |
| WO | WO 98/39755 A2 * | 9/1998 |
| WO | WO 00/41009 A1 * | 7/2000 |

* cited by examiner

*Primary Examiner*—Fayez G. Assaf
(74) *Attorney, Agent, or Firm*—Sangya Jain

(57) ABSTRACT

An optical film composed by laminating a light scattering film 1 scattering and transmitting light and comprising at least two phases or more different in refractive index and a reflective polarizer 2 selectively P/S converting the light. It is preferred that at least one phase of the light scattering film larger in the refractive index has a columnar structure extending in the thickness direction of the film and the transmittance of the film in the normal direction is 4% or more. The optical film is excellent in visibility, is small in light loss in order to provide an excellently visible and bright image, and has an excellent light collecting property when used in a liquid crystal display device or the like.

17 Claims, 4 Drawing Sheets

OPTICAL FILM HAVING CONTROLLED SCATTERING/TRANSMITTING CHARACTERISTICS

This application is a continuation of PCT International Application PCT/JP02/03760 with an international filing date of Apr. 16, 2002 based on a priority application 2001-123389 filed in the Japanese Patent Office with a priority filing date of Apr. 20,2001.

TECHNICAL FIELD

The present invention relates to an optical film with controlled light scattering characteristic and selectively P/S converting characteristic.

BACKGROUND ART

In a reflection type or transflection type liquid crystal display, generally, an incident light transmits through a liquid crystal layer, reflected by a reflective film, and transmits again through the liquid crystal layer, and then a display image gets into eyes of a viewer. At this time, by disposing a light scattering film on the surface side of the liquid crystal layer and/or between the liquid crystal layer and reflective film to scatter the light, the image can be recognized in a wide viewing angle. As these methods of scattering the light, there are representatively illustrated a method of scattering light by dispersing and containing transparent fine particles in a plastic film or an adhesive and a method of scattering light by roughening the surface of a plastic film.

To improve the brightness in the transmitting state of transmission or transflection, a reflective polarizer is widely used for converting P wave or S wave formed by the P/S change, which is caused by birefringence of liquid crystal, to S wave or P wave selectively by multiple reflection and thereby preventing loss of light.

However, when such reflective polarizer by which light is selectively P/S converted is used in a transflection type or reflective type liquid crystal display, in particular, there are problems that the brightness of display is dark and the visibility thereof is poor. To improve these points, it is thought to use a light scattering film. But when the conventional scattering film in which transparent fine particles are dispersed and contained is used, not only the brightness is lowered at the time of transmission, but also improvement of brightness in reflection is not enough because of scattering in all directions.

The present invention is devised to solve these problems in the prior art. That is, an object of the present invention is to provide an optical film which, when use in, for example, a liquid crystal display device, is smaller in loss of light and has a light collecting performance so as to realize a bright and visible excellent image as compared with ones in the prior art.

DISCLOSURE OF THE INVENTION

An optical film of the present invention used for achieving the object described above is an optical film having the following features.
  (1) An optical film which is a layered product of a light scattering film that scatters and transmits light and is constituted by at least two phases or more having different refractive indexes each other, and a reflective polarizer by which light is selectively P/S converted.
  (2) The optical film according to item (1) above wherein at least one of the phases which has a greater refractive index in the light scattering film has pillar structures extending in the thickness direction of the film, and the transmittance of the film in the normal direction of the film is not less than 4%.
  (3) The optical film according to item (1) or (2) above, wherein plural axis lines of the pillar structures extending in the thickness direction of the light scattering film are in parallel with each other and the direction of the axis lines thereof are orientated in the normal direction of the film.
  (4) The optical film according to item (1) or (2) above, wherein plural axis lines of the pillar structures extending in the thickness direction of the light scattering film are in parallel with each other and the direction of the axis lines are inclined with respect to the normal direction of the film.
  (5) The optical film according to any one of items (1) to (4) above, wherein difference in refractive indexes between at least two phases or more having different refractive indexes of the light scattering film is in a range of 0.005 to 0.1.
  (6) The optical film according to any one of items (1) to (5) above, wherein said light scattering film is made from a polymer material having a radiation sensitive property.
  (7) The optical film according to any one of items (1) to (6) above, wherein said reflective polarizer is of a lamination type.
  (8) The optical film according to any one of items (1) to (6) above, wherein said reflective polarizer is a film making use of selective reflection characteristic of cholesteric liquid crystal.

SPECIFIC MODE FOR CARRYING OUT THE INVENTION

The present invention is described in detail below. First the light scattering phenomenon in a conventional light scattering film is explained by referring to FIG. 1, and then the light scattering film using the optical film of the present invention is explained by referring to FIG. 2.

Figure 1:
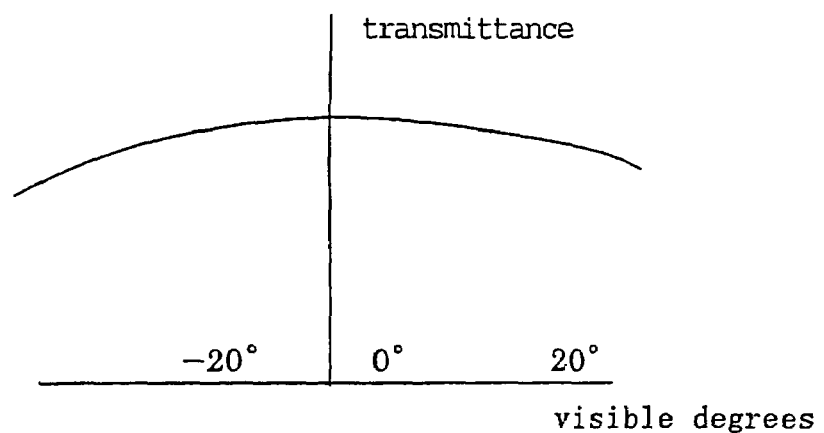
FIG. 1 is a diagram showing a transmittance characteristic of a light diffusing film (light scattering film) dispersing fine particles therein.

FIG. 1 is a light transmission characteristic diagram of a light scattering film or layer formed by dispersing transparent fine particles different in refractive index in a polymer film or an adhesive. As shown in FIG. 1, the light scattering characteristic of a conventional light scattering film or layer dispersing fine particles therein shows broad scattering of light over a wide angle, and the scattered light shows a distribution changing moderately in all angles.

Figure 2:
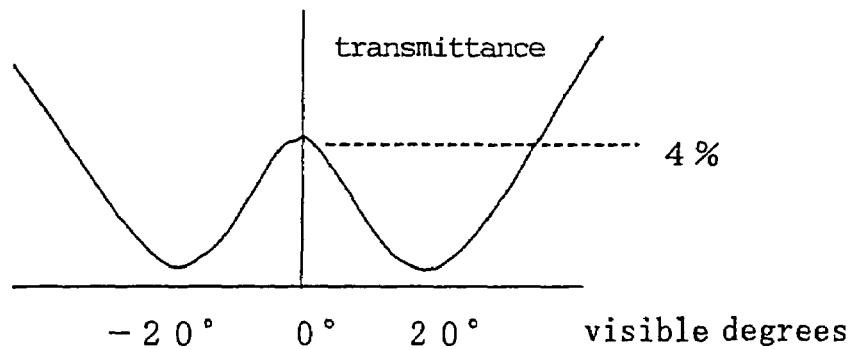
FIG. 2 is a diagram showing a transmittance characteristic of a light scattering film to be used in the present invention.

FIG. 2 shows a transmission characteristic of the light scattering film used in the present invention. The light entering the film at right angles (incident angle of zero degree) shows a certain transmission characteristic owing to the film, and as the incident angle becomes larger, the scattering performance is enhanced, and the maximum scatter is observed at a desired angle. Then, as the angle becomes much larger, the transmission is intensified again, and the scattering performance decreases. For example, the light incident at an angle of 45 degrees to 60 degrees to the film surface is hardly scattered but transmits through. This is an extremely special optical characteristic, and by making use of this characteristic, an optical film capable of sufficiently extracting the characteristic of the reflective polarizer can be realized.

The light scattering film to be used in the present invention is a film composed at least two or more phases mutually different in refractive index. It is preferred that at least one phase larger in refractive index constitutes a columnar structure extending in the thickness direction of the film. The directions of the axis lines of the columnar structure are not particularly limited. However the more the directions are uneven, the more the light is scattered broadly, and the scattered light distribution changes moderately in all angles. Therefore the axis lines of the columnar structure should more preferably be parallel to each other. Further, such special optical characteristic can be adjusted by adjusting the angle between the axis line of the columnar structure and the normal direction of the film. That is, the relative angle of the liquid crystal display and viewer differs depending on the application, but the optical characteristic can be properly adjusted depending on such differing angle. Considering a relative angle of the liquid crystal display and viewer in a general apparatus using a liquid crystal display, the angle of the axis line of the columnar structure and the normal direction of the film is preferred to be 0 degree to 45 degrees. The transmittance in the normal direction of the light scattering film (the transmittance at visible angle of 0 degree in FIG. 2) is preferred to be 4% or more.

The light scattering film used in the optical film of the present invention may be manufactured by any conventional method, but it is preferred to form a columnar structure having high refractive index by coating a radiation sensitive prepolymer or monomer material on a plastic film, drying, and irradiating the radiation sensitive material with radiation selectively with a desired mask. Herein, at the time of irradiation, the angle of the axis line of the columnar structure and the normal direction of the film can be adjusted by irradiating the radiation sensitive material with radiation from a specified angle. After irradiation, if necessary, a prepolymer or monomer material may be polymerized by heating or other method. The photo mask used in irradiation of the radiation sensitive material may be manufactured by a conventional method of manufacturing a photo mask. Photo mask manufacturing methods include the method of using photolithography among others. Further, the radiation sensitive material may be directly scanned and exposed, without photo mask, by using laser beam, X-ray or electron beam to form a high refractive index region in the radiation sensitive material. The light scattering film used in the present invention may be also formed by piercing the plastic film directly by laser beam or another method, and filling the holes with a material having a higher refractive index than the plastic film.

The radiation sensitive material capable of forming a high refractive index region by irradiation with radiation is not particularly limited. For example, there may be used commercial products OMNIDEX (registered trademark) HRF150 and HRF600 of Du Pont Co. If the radiation sensitive material is ones showing birefringence, coloring or other phenomenon may be observed and it is not preferred, but if the birefringence is within an allowable range, presence of birefringence is permissible. The material for forming the light scattering film itself is preferred to be a material with high light transmission.

The refractive index difference of phases differing in refractive index in the light scattering film is generally preferred to be set at a refractive index difference of 0.005 to 0.1. When the refractive index difference is less than 0.005, it is not easy to obtain a sufficient scattering characteristic. More preferably, the refractive index difference is in a range of 0.01 to 0.1. The refractive index may change suddenly at the interface of a high refractive index region and another phase, but a preferred scattering characteristic is obtained when changed gradually.

Figure 3:
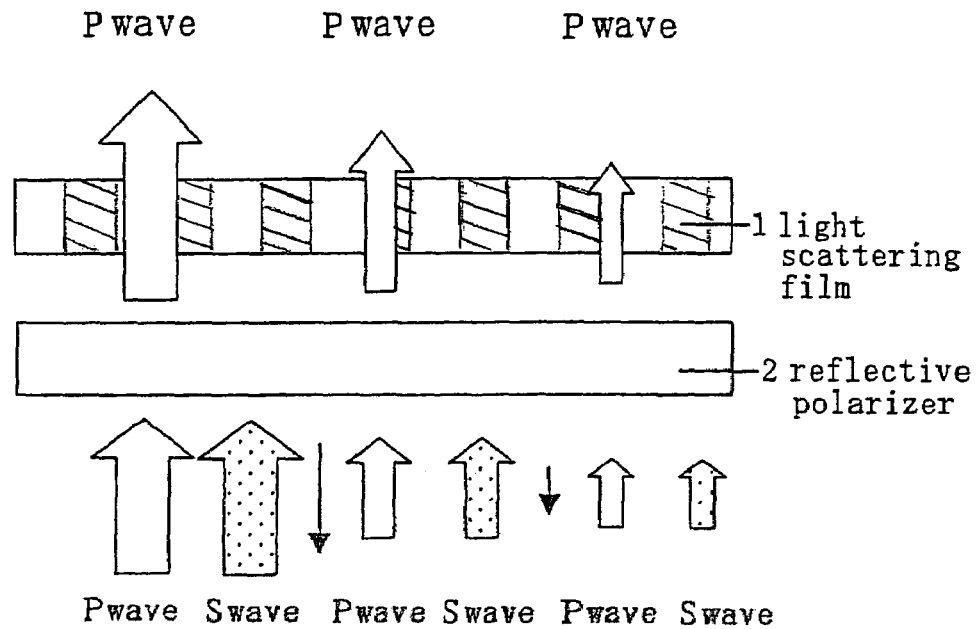
FIG. 3 is an explanatory diagram of action principle of a reflective polarizer and action principle of an optical film of the present invention.

On the other hand, the reflective polarizer 2 transmits only the P wave of the incident light as shown in FIG. 3, and reflects the S wave, and further transmits the P wave of the light reflected by the reflection face of back light unit or the like and reflects the S wave. While repeating this action, the S wave is converted into P wave, and the S wave that has not been used hitherto can be utilized, and therefore the brightness is raised notably by the use of the reflective polarizer. The reflective polarizer 2 is available in laminate type and cholesteric liquid crystal type, and they are equal in effects.

To use this reflective polarizer 2 in the liquid crystal display of cellular telephone, PDA or the like, it is required to secure brightness when reflecting. When adhering to raise the brightness in transmission too much, the brightness in reflection is lowered. It is the primary object of the present invention to provide an optical film realizing a bright and visible excellent image in both transmission and reflection states in the liquid crystal display of cellular telephone, PDA or the like. Therefore the optical characteristic of the optical film of the present invention is explained more specifically. In this explanation, the light characteristic in two states of transmission and reflection is described while referring also to FIG. 4 and showing the optical characteristic of each film.

Figure 4:
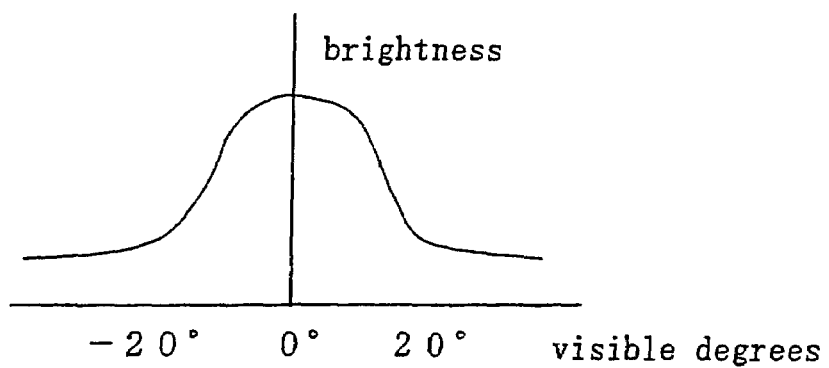
FIG. 4 is a diagram showing the visible angle dependence of brightness of a reflective polarizer to be used in an embodiment of the present invention.

FIG. 4 is a brightness distribution of light from the back light outgoing through the reflective polarizer 2. Usually, by the BEF (light collecting sheet) used in the back light unit, the light from the back light is collected, and enters the reflective polarizer. The incident light is further enhanced in brightness by P/S conversion shown in FIG. 3, and gets into the light scattering film 1. The transmission light from the light scattering film 1 shows the viewing angle dependence as shown in FIG. 4, and when the transmission light transmits more near the normal line and the transmittance becomes smaller at the wider angle side, and the transmission becomes minimum around ±20 degrees to the normal line, that is, the scattering reaches the maximum.

In the case of transmission, since the incident light is collected around ±20 degrees as described above, the light is emitted in the direction of normal line of the film while minimizing the effect of scatter.

In the present invention, the BEF is not particularly required in the back light unit, and collecting of light is not always needed. In this case, the light intense region in the center is the region near the normal direction of the light scattering film (the region of relatively high transmittance), and the light transmits without having effects of scatter practically same as described above, and the light around ±20 degrees to the normal line is scattered and diffuses in the periphery. Usually, as compared with an ordinary film dispersing transparent fine particles or a light scattering film dispersing transparent fine particles in an adhesive, the light scattering film 1 used herein is small in the scattering angle (when defined by the half width of scattering light in Gaussian distribution, the half width of the light scattering film of the present invention is 10 degrees to 30 degrees), and the scattered light is focused in a direction closer to the normal direction of the film. Thus, the optical film of the present invention in transmission realizes an ideal display state high in the brightness in the normal direction and suppressed moderately in glare.

Figure 6:
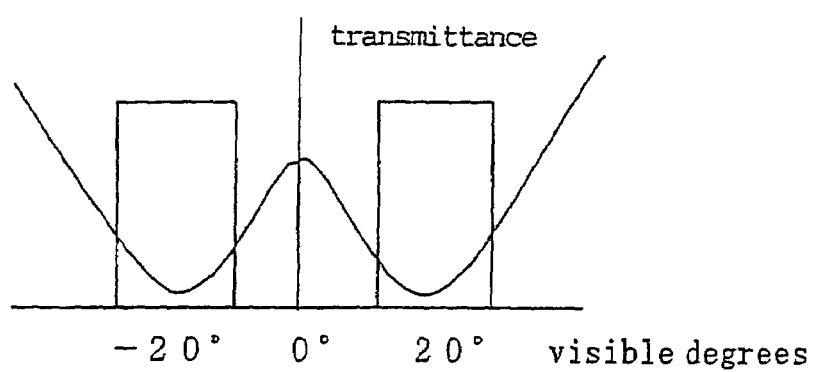
FIG. 6 is a diagram showing an effective scattering region in reflection of a liquid crystal display in an example of the optical film of the present invention.

Explained below is the effect of the optical film of the present invention in reflection. FIG. 6 is a diagram showing a maximum scattering region of visible angle given by the optical scattering film of the optical film of the present invention. The range of 10 degrees to 15 degrees around the visible angles of +20 degrees and −20 degrees is the angle contributing most to the scatter. That is, the light inclined by 20 degrees from the normal direction of the optical film surface is scattered most intensely, which contributes to the brightness in reflection. The light source is usually considered to be positioned in a direction deviated by about 20 degrees from the front side, and it is considered ideal to set the maximum scatter angle at ±20 degrees to the normal direction of the light scattering film. Therefore, the scattering maximum angle of the optical film of the present invention is considered to be closest to the ideal point.

Figure 5:
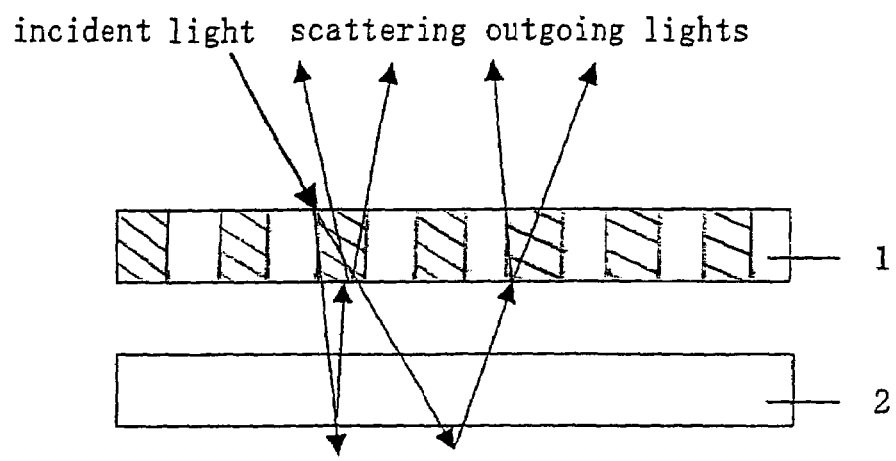
FIG. 5 is a schematic diagram showing progress of light in reflection of the optical film of the present invention.

FIG. 5 is a schematic expression of propagation of light when the light enters at about 20 degrees from the normal direction. As described above, the light scattering film 1 of the present invention tends to scatter the incident light of about 20 degrees most efficiently and then collect the light in the front direction by focusing.

As described herein, the optical film of the present invention has the properties of transmitting the light efficiently and displaying the image clearly without lowering the brightness at the time of transmission, and collecting the peripheral light, especially the light from the light source at the front side efficiently in the normal direction of the film, that is, in the viewing angle direction at the time of reflection, and is hence an optical film most appropriate in a transflection type liquid crystal display device to be used in cellular telephone, PDA or the like.

BEST MODE FOR CARRYING OUT THE PRESENT INVENTION

The present invention is described more specifically by referring to preferred embodiments, but it should be noted that the present invention is not limited by these embodiments alone.

EXAMPLE 1

Figure 7:
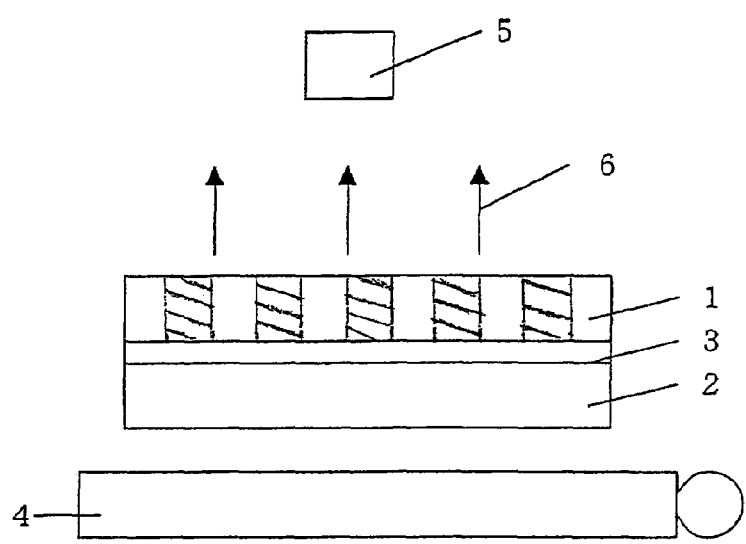
FIG. 7 is an explanatory diagram of a configuration example of the optical film of the present invention and brightness measuring method of this optical film.

As a reflective polarizer 2, a DBEF of 3M Co. was used, and an acrylic adhesive 3 was coated on this DBEF in a thickness of 25 μm. An MFI 50A1000 of Microsharp Co. was adhered thereon as a light scattering film 1, and an optical film having a structure as shown in FIG. 7 was laminated.

This film was disposed on a back light unit 4, and the brightness was measured by a photodetector 5. In FIG. 7, measurement of the brightness in the film normal direction is being conducted by measuring the amount of outgoing light 6 in the normal direction of the film with photodetector 5.

COMPARATIVE EXAMPLE

Instead of the optical film in Example 1, an SK80 of Sumitomo Chemical Industry Co. which is a light scattering adhesive dispersing transparent fine particles different in refractive index in a conventional acrylic adhesive was disposed on the back light unit 4, and the brightness was measured by the photodetector 5.

The brightness was compared between Example 1 and Comparative Example, and it was known that the brightness of the optical film in Example 1 was higher by 30% to 50% as compared with that of the film in the Comparative Example.

EXAMPLE 2

An optical film was laminated in the same manner as in Example 1 except that a PCF400 of Nitto Denko Co. was used as the reflective polarizer 2, and the film was disposed on the back light unit 4, and the brightness was measured in the same manner as in Example 1.

The brightness of the optical film in Example 2 was higher by 30% to 50% as compared with that of the film in the Comparative Example.

EXAMPLE 3

An optical film was laminated in the same manner as in Example 1 except that a Transmax of Merck Co. was used as the reflective polarizer 2, and the film was disposed on the back light unit 4, and the brightness was measured in the same manner as in Example 1.

The brightness of the optical film in Example 3 was higher by 30% to 50% as compared with that of the film in the comparative example.

The invention claimed is:

1. An optical film, for use in a liquid crystal display which comprises a liquid crystal cell and a back light unit, comprising a layered product of,
   (1) a reflective polarizer by which light is selectively P/S converted, which is disposed on the back light unit, and
   (2) a light scattering film that scatters and transmits light and comprises at least two phases having different refractive indices from each other, which is disposed on the reflective polarizer,
   wherein at least one of the phases which has the greater refractive index in the light scattering film has pillar structures extending in the thickness direction of the film, and further where the refractive index changes gradually at the interface of the greater refractive index phase and another phase, and furthermore the transmittance of the light scattering film in the normal direction of the film is not less than 4%, and wherein an absolute value of a light incident angle where the scattering film has a maximum scattering performance is larger than zero degrees, when zero degrees is a light incident angle that light enters the film in the normal direction of the film.

2. The optical film according to claim 1, wherein axis lines of the pillar structures extending in the thickness direction of the light scattering film are in parallel with each other and the direction of the axis lines thereof are orientated in the normal direction to the film.

3. The optical film according to claim 2, wherein difference in refractive indices between at least two phases having different indices of the light scattering film is in a range of 0.005 to 0.1.

4. The optical film according to claim 2, wherein said light scattering film is made from a polymer material having a radiation sensitive property.

5. The optical film according to claim 2, wherein said reflective polarizer is of a lamination type.

6. The optical film according to claim 2, wherein said reflective polarizer is of a cholesteric liquid crystal type.

7. The optical film according to claim 1, wherein axis lines of the pillar structures extending in the thickness direction of the light scattering film are in parallel with each other and the direction of the axis lines are inclined with respect to the normal direction to the film.

8. The optical film according to claim 7, wherein difference in refractive indices between at least two phases having different refractive indices of the light scattering film is in a range of 0.005 to 0.1.

9. The optical film according to claim 7, wherein said light scattering film is made from a polymer material having a radiation sensitive property.

10. The optical film according to claim 7, wherein said reflective polarizer is of a lamination type.

11. The optical film according to claim 7, wherein said reflective polarizer is of a cholesteric liquid crystal type.

12. The optical film according to claim 1, wherein difference in refractive indices between at least two phases having different refractive indices of the light scattering film is in a range of 0.005 to 0.1.

13. The optical film according to claim 1, wherein said light scattering film is made from a polymer material having a radiation sensitive property.

14. The optical film according to claim 1, wherein said reflective polarizer is of a lamination type.

15. The optical film according to claim 1, wherein said reflective polarizer is of a cholesteric liquid crystal type.

16. The optical film according to claim 1, wherein the scattering performance of the scattering film is enhanced when the absolute value of the incident angle changes from zero degrees to the absolute value of the incident angle with a maximum scattering performance, and the scattering performance decreases after the absolute value of the incident angle with maximum scattering performance.

17. The optical film according to claim 1, wherein the absolute value of the incident angle with a maximum scattering performance is around 20 degrees.

* * * * *